United States Patent
Ekin et al.

(10) Patent No.: US 10,177,616 B2
(45) Date of Patent: Jan. 8, 2019

(54) SPOKE PERMANENT MAGNET ROTOR (71) Applicant: ARCELIK ANONIM SIRKETI, Istanbul (TR)

(72) Inventors: Cihad Ekin, Istanbul (TR); Emin Gultekin Sonmez, Istanbul (TR); Yakup Imat, Istanbul (TR); Mahmut Himyeri, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 175 days.

(21) Appl. No.: 14/648,858

(22) PCT Filed: Nov. 8, 2013

(86) PCT No.: PCT/EP2013/073415
§ 371 (c)(1),
(2) Date: Jun. 1, 2015

(87) PCT Pub. No.: WO2014/082840
PCT Pub. Date: Jun. 5, 2014

(65) Prior Publication Data
US 2015/0318744 A1 Nov. 5, 2015

(30) Foreign Application Priority Data
Nov. 30, 2012 (TR) ............. a 2012 13949

(51) Int. Cl.
*H02K 1/27* (2006.01)

(52) U.S. Cl.
CPC ................. *H02K 1/2773* (2013.01)

(58) Field of Classification Search
CPC ................................ H02K 1/2773
(Continued)

(56) References Cited

U.S. PATENT DOCUMENTS 4,445,062 A    4/1984  Glaser
4,631,807 A *  12/1986 Kawada ............... H02K 1/2773
                                                      29/418
(Continued)

FOREIGN PATENT DOCUMENTS

CN    101032067 A    9/2007
CN    102035281 A    4/2011
(Continued)

OTHER PUBLICATIONS

International Search Report of WO 2014/082840A1 ( and references cited therein) and Written Opinion of International Searching Authority.
(Continued)

*Primary Examiner* — Alex W Mok
(74) *Attorney, Agent, or Firm* — Kilpatrick Townsend & Stockton LLP (57) ABSTRACT

The present invention relates to a spoke-type permanent magnet rotor (1) used in brushless direct current electric motors (13), forming the rotating part inside the stator (14) that forms the stationary part thereof and having an air gap (15) between the inner surface of the stator (14) and itself, comprising a cylindrical core (2) produced from ferromagnetic laminations or ferromagnetic powder metal, a shaft (3) fixed to the core (2) and forming the rotational axis of the rotor (1), a hub (5) disposed at the center of the core (2) and having a shaft hole (4) that bears the shaft (3), more than one pole segment (6) disposed all around the hub (5), more than one magnet slot (7) disposed between the pole segments (6), more than one magnet (8) tangentially magnetized, placed in the magnet slots (7) and extending outwards in the radial direction, and two end rings (9) produced from non-magnetic materials such as plastic and aluminum and fixed on
(Continued)

the front and rear planar surfaces of the core (2) by the injection molding method.

4 Claims, 6 Drawing Sheets

(58) Field of Classification Search
USPC .................................................. 310/156.56
See application file for complete search history.

(56) References Cited

U.S. PATENT DOCUMENTS

| | | | |
|---|---|---|---|
| 4,864,175 A | 9/1989 | Rossi | |
| 4,954,736 A * | 9/1990 | Kawamoto | H02K 1/278 310/156.21 |
| 5,200,662 A * | 4/1993 | Tagami | H02K 1/2773 310/114 |
| 5,463,262 A | 10/1995 | Uchida | |
| 5,990,592 A * | 11/1999 | Miura | H02K 1/276 29/598 |
| 6,703,741 B1 * | 3/2004 | Ifrim | H02K 1/2773 310/156.19 |
| 6,987,342 B2 | 1/2006 | Hans | |
| 7,148,598 B2 | 12/2006 | Ionel et al. | |
| 7,151,336 B2 | 12/2006 | Yokochi et al. | |
| 7,196,446 B2 | 3/2007 | Hans | |
| 7,474,028 B2 | 1/2009 | Shim et al. | |
| 8,018,110 B2 * | 9/2011 | Alexander | H02K 1/2773 310/156.56 |
| 9,362,792 B2 * | 6/2016 | Figgins | H02K 1/28 |
| 2004/0004407 A1 * | 1/2004 | Laurent | H02K 1/2773 310/156.48 |
| 2005/0093391 A1 * | 5/2005 | McMullen | H02K 1/2766 310/156.55 |
| 2006/0061227 A1 | 3/2006 | Heideman | |
| 2006/0202580 A1 | 9/2006 | Lee et al. | |
| 2006/0220485 A1 | 10/2006 | Shim et al. | |
| 2007/0085437 A1 | 4/2007 | Heideman | |
| 2007/0252469 A1 | 11/2007 | Nishiura et al. | |
| 2009/0096308 A1 | 4/2009 | Staudenmann | |
| 2009/0284094 A1 | 11/2009 | Horng et al. | |
| 2011/0121668 A1 | 5/2011 | Condamin et al. | |
| 2011/0204740 A1 | 8/2011 | Vedy et al. | |
| 2012/0038237 A1 | 2/2012 | Li et al. | |
| 2012/0112591 A1 | 5/2012 | Feuerrohr et al. | |
| 2012/0326548 A1 | 12/2012 | Nonaka | |
| 2013/0187506 A1 | 7/2013 | Lee et al. | |
| 2015/0061441 A1 | 3/2015 | Figgins et al. | |
| 2015/0295460 A1 | 10/2015 | Ekin et al. | |
| 2015/0303751 A1 | 10/2015 | Ekin et al. | |

FOREIGN PATENT DOCUMENTS

| | | |
|---|---|---|
| CN | 102111025 A | 6/2011 |
| CN | 102124633 A | 7/2011 |
| CN | 102377257 A | 3/2012 |
| DE | 10219190 A1 | 11/2003 |
| DE | 102007024406 A1 | 11/2008 |
| DE | 102009045101 A1 | 4/2011 |
| DE | 102010061778 A1 | 5/2012 |
| DE | 102010061784 A1 | 5/2012 |
| DE | 102010064259 A1 | 6/2012 |
| EP | 0086272 B1 | 4/1986 |
| EP | 0582721 B1 | 5/1997 |
| EP | 0872944 A1 | 10/1998 |
| EP | 1557928 A1 | 7/2005 |
| EP | 1619770 A2 | 1/2006 |
| EP | 2403109 A2 | 1/2012 |
| JP | S6135501 A | 2/1986 |
| JP | S6356138 A | 3/1988 |
| JP | S63213444 A | 9/1988 |
| JP | H05244741 A | 9/1993 |
| JP | H0847190 A | 2/1996 |
| JP | 2000116044 A | 4/2000 |
| JP | 2001119877 A | 4/2001 |
| JP | 2001204146 A | 7/2001 |
| JP | 2003134705 A | 5/2003 |
| JP | 2003324925 A | 11/2003 |
| KR | 20130027417 A | 3/2013 |
| WO | 2012022731 A2 | 2/2012 |

OTHER PUBLICATIONS

Final Office Action dated Jun. 7, 2017, of U.S. Appl. No. 14/648,840; 12 pgs.
International search report and written opinion, dated Feb. 18, 2015, of International Application No. PCT/EP2013/073398; 7 pgs.
International search report and written opinion, dated Feb. 18, 2015, of International Application No. PCT/EP2013/073406; 7 pgs.
Non-Final Office Action dated Jan. 13, 2017, of U.S. Appl. No. 14/648,840; 12 pgs.
Non-Final Office Action dated Jan. 18, 2017, of U.S. Appl. No. 14/648,817; 25 pgs.
Final Office Action dated Aug. 4, 2017, of U.S. Appl. No. 14/648,817; 23 pgs.
Non-Final Office Action dated Nov. 30, 2017, of U.S. Appl. No. 14/648,817; 28 pgs.
Non-Final Office Action dated Mar. 8, 2018, of U.S. Appl. No. 14/648,840; 14 pgs.

* cited by examiner

SPOKE PERMANENT MAGNET ROTOR

The present invention relates to a spoke permanent magnet rotor used in brushless direct current motors.

The developments and regulations in the field of energy efficiency have increased the demand for high-efficiency electric motors. Spoke-type rotors comprise more than one magnet placed between the pole segments forming the rotor core and the magnets extend in the radial direction around the rotor shaft towards the outer periphery of the rotor core. The magnets are tangentially magnetized with respect to their thickness and the magnetic flux generated by the magnets is collected on the pole pieces between which the magnets are placed. In spoke-type rotors, the magnetic flux density in the air gap between the stator and rotor, in other words the amount of the useful flux that provides the rotation of the rotor at the desired speed and torque is increased as compared to other magnet rotors. Despite the said advantages of spoke-type rotors, the mechanical structure of the core is weakened and the resistance of the rotor to centrifugal forces decreases due to the magnets extending from the center outwards in the radial direction and which are positioned close to each other.

In the United States Patent Application No. US2007085437, a spoke permanent magnet rotor used in electric motors and the production method thereof are explained.

The aim of the present invention is the realization of a spoke-type permanent magnet rotor wherein the resistance thereof to centrifugal forces is increased.

The spoke-type rotor realized in order to attain the aim of the present invention, explicated in the first claim and the respective claims thereof, forming the rotating portion in the stator in a brushless direct current motor and having an air gap between the stator and itself, comprises a ferromagnetic core, a shaft forming the rotational axis thereof, a hub bearing the shaft at the center of the core, pole segments disposed around the hub, magnets placed in the magnet slots between the pole segments, end rings produced from non-magnetic materials such as plastic or aluminum and covered on the front and rear surfaces of the core by the injection molding method, and magnet holding protrusions extending right and left from the pole segments over the magnet slots. In the rotor of the present invention, there are slot orifices that narrow from the magnet slots towards the air gap in the radial direction between the magnet holding protrusions. A cage structure composed of bars extending in the axial direction is obtained around the core by injecting a non-magnetic material, for example plastic, into the slot orifices. The bars injected into the slot orifices have naturally the same narrowing cross-sections as the slot orifices.

When the magnets are forced to move outwards in the radial direction during the high speed movement of the rotor, the bars are squeezed between the magnet holding protrusions inside the slot orifices, increasing the resistance to centrifugal forces. In an embodiment of the present invention, the edges of the narrowing slot orifices are Y-shaped.

In other embodiments of the present invention, the edges of the slot orifices are convex or concave, facilitating the injection of the bars into the slot orifices, thus the bars are filled into the slot orifices without leaving any gaps.

The rotor realized in order to attain the aim of the present invention is illustrated in the attached figures, where.

The elements illustrated in the figures are numbered as follows:
1. Rotor
2. Core
3. Shaft
4. Shaft hole
5. Hub
6. Pole segment
7. Magnet slot
8. Magnet
9. End ring
10. Magnet holding protrusion
11. Slot orifice
12. Bar
13. Motor
14. Stator
15. Air gap The spoke-type permanent magnet rotor (1) used in the brushless direct current electric motors (13) driving the components like drum, circulation pump and discharge pump in household appliances like laundry washing and/or drying machine and dishwasher, forming the rotating part inside a stator (14) that forms the stationary part thereof and having an air gap (15) between the inner surface of the stator (14) and itself, comprises a cylindrical core (2) produced from ferromagnetic laminations or ferromagnetic powder metal, a shaft (3) that is fixed to the core (2) and forming the rotational axis of the rotor (1), a hub (5) disposed at the center of the core (2) and having a shaft hole (4) that bears the shaft (3), more than one pole segment (6) disposed all around the hub (5), more than one magnet slot (7) disposed between the pole segments (6), more than one magnet (8) tangentially magnetized, placed in the magnet slots (7) and extending outwards in the radial direction, two end rings (9) produced from non-magnetic materials such as plastic or aluminum, fixed on the front and rear planar surfaces of the core (2) by the injection molding method and providing the balance of the rotor (1), and more than one magnet holding protrusion (10) extending from each pole segment (6) over the magnet slots (7) between the magnet (8) and the air gap (15) and preventing the magnets (8) from dislodging from the magnet slots (7) with the effect of the centrifugal force.

The rotor (1) of the present invention comprises more than one slot orifice (11) situated between the magnet holding protrusions (10) and narrowing from the magnet slot (7) towards the air gap (15) in the radial direction, and more than one bar (12) produced by injecting non-magnetic material such as plastic into the slot orifices (11), extending along the core (2) in the axial direction between the end rings (9) and forming a cage that surrounds the core (2) between the magnet slots (7) and the air gap (15) (FIG. 6, FIG. 7, FIG. 8, FIG. 12). The cross-sections of the bars (12)

have the same narrowing form as the slot orifice (11). The all around cage structure formed by the bars (12) hold together the pole segments (6) and the magnets (8) in a rigid structure, increases the resistance to centrifugal forces, decreases the noise level of the motor (13) and prevents overheating.

In the rotor (1) of the present invention, the inner surfaces facing each other of the magnet holding protrusions (10) are produced in opposite angles so as to get closer to each other from the magnet (8) towards the air gap (15), and thus the narrowing form of the slot orifice (11) is obtained. The cross-sections of the bars (12), formed by injecting non-magnetic material into the slot orifices (11) during the production of the end rings (9), are naturally in a form narrowing outwards in the radial direction. The bars (12) having the same form as the narrowing slot orifices (11) and filling therein are squeezed between the inner surfaces of the magnet holding protrusions (10) with opposite angles and increase the resistance to centrifugal forces when the magnets (8) are forced to move outwards in the radial direction with the effect of the centrifugal force.

Figure 1:
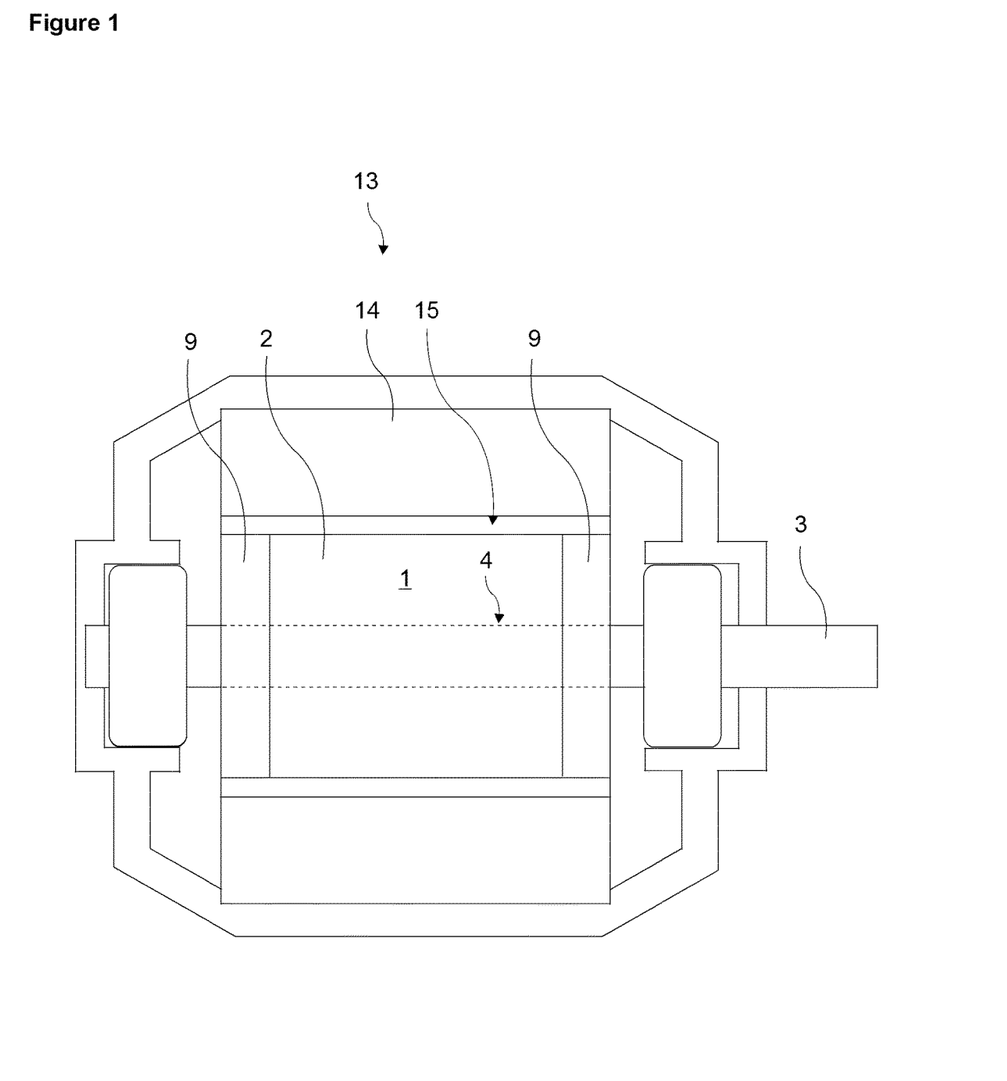
FIG. 1—is the schematic view of an electric motor.
Figure 2:
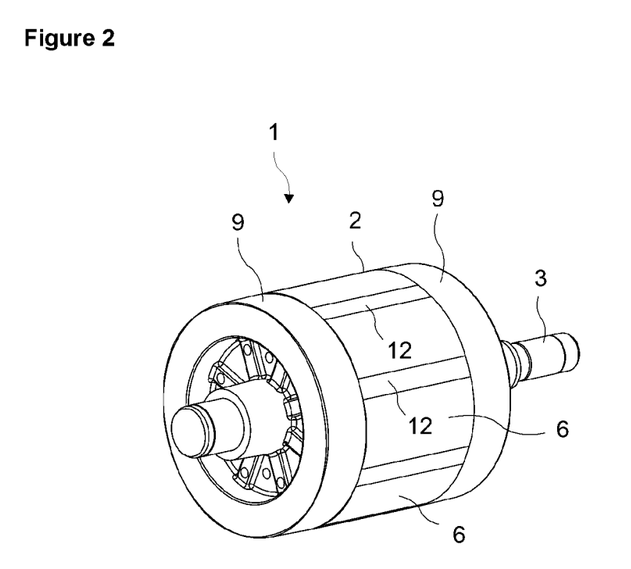
FIG. 2—is the perspective view of a spoke rotor.
Figure 3:
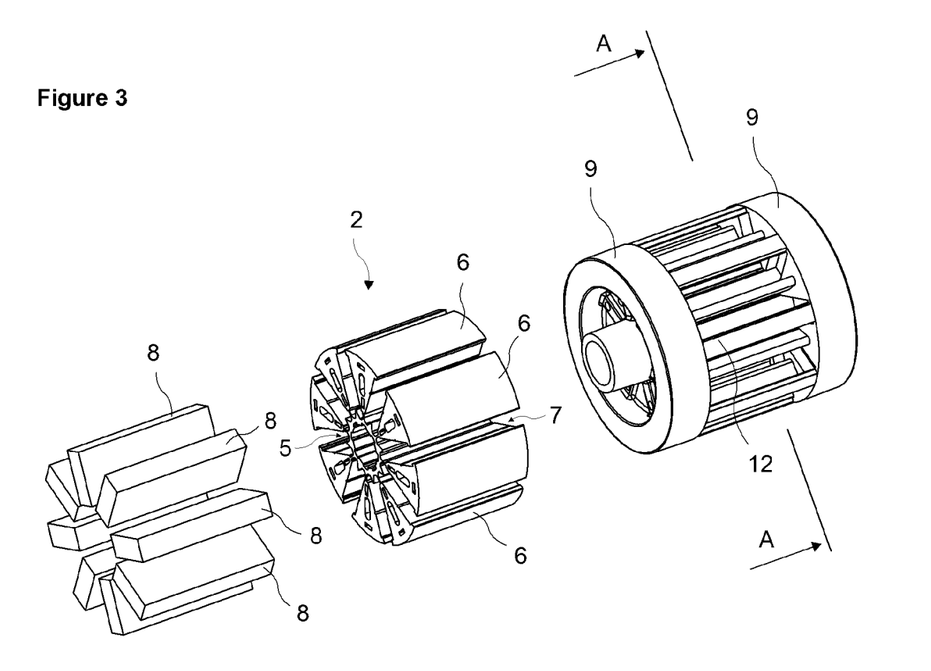
FIG. 3—is the exploded view of a spoke rotor.
Figure 4:
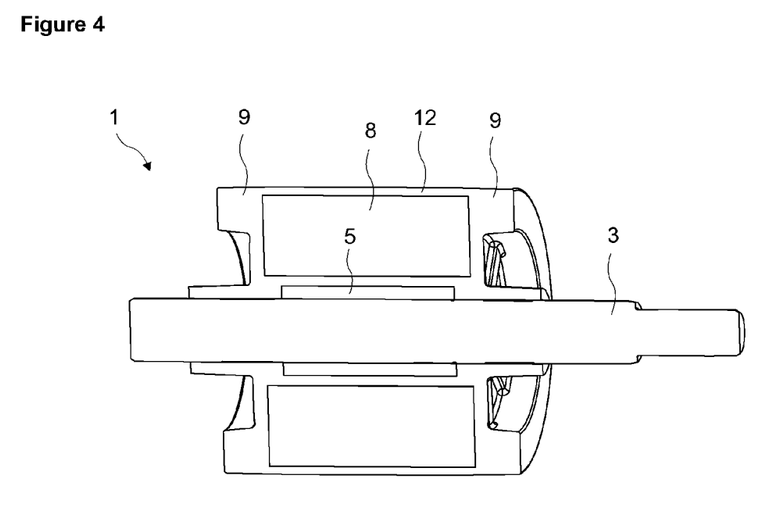
FIG. 4—is the longitudinal cross-sectional view of a spoke rotor.
Figure 5:
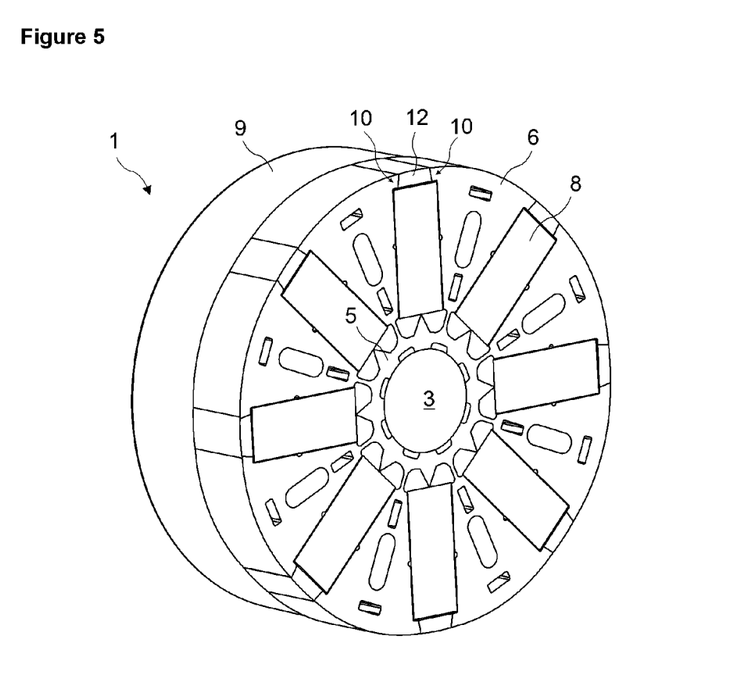
FIG. 5—is the transversal cross-sectional view of a spoke rotor.
Figure 6:
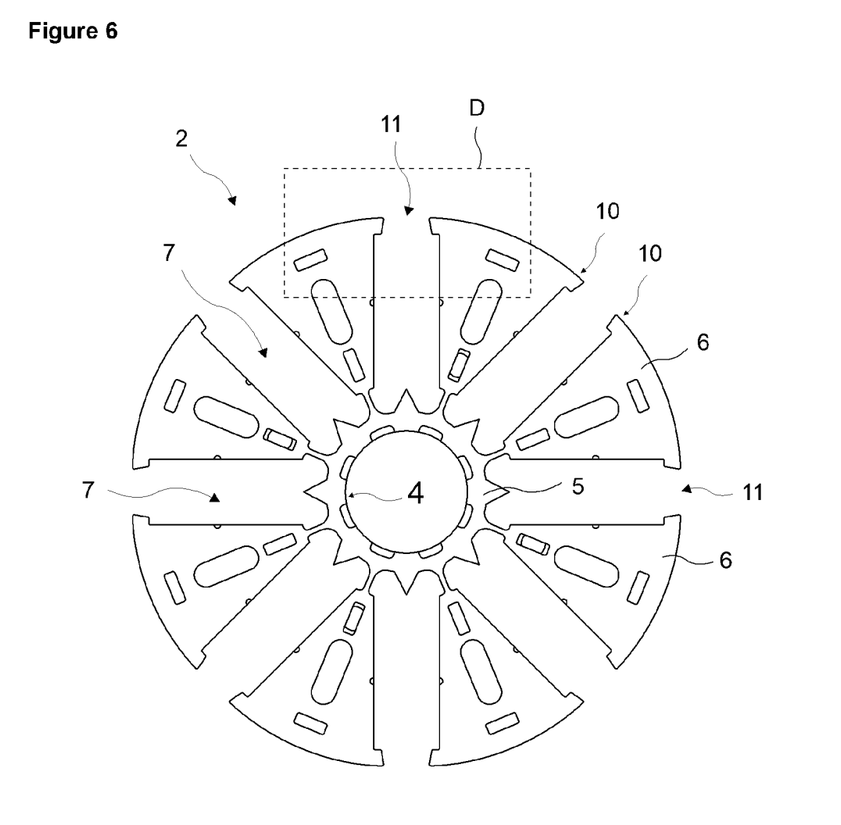
FIG. 6—is the front view of a spoke rotor core.
Figure 7:
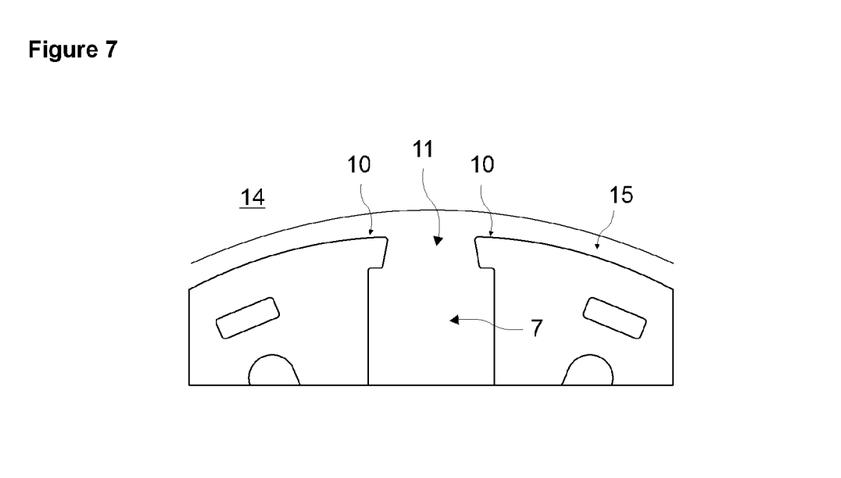
FIG. 7—is the view of detail D in FIG. 6.
Figure 8:
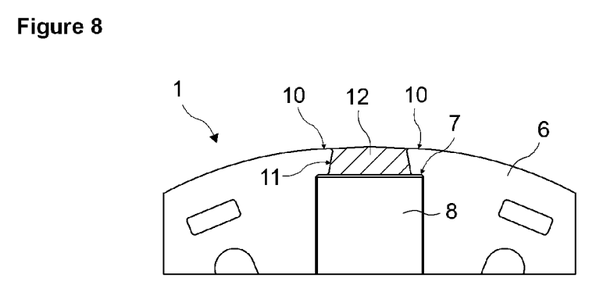
FIG. 8—is the view of the magnet slot orifice of the spoke rotor in an embodiment of the present invention.
Figure 9:
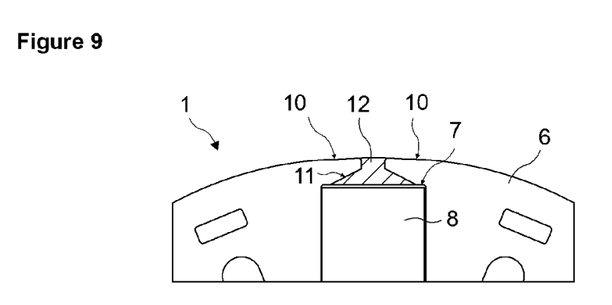
FIG. 9—is the view of the magnet slot orifice of the spoke rotor in another embodiment of the present invention.

In another embodiment of the present invention, the slot orifices (11) are Y-shaped. In this embodiment, the surfaces facing each other of the magnet holding protrusions (10) that limit the slot orifices (11) are produced angularly so as to get closer to each other at the magnet (8) side and in parallel at the air gap (15) side (FIG. 9).

Figure 10:
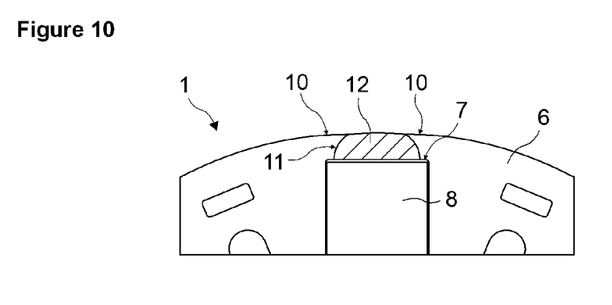
FIG. 10—is the view of the magnet slot orifice of the spoke rotor in another embodiment of the present invention.

In another embodiment of the present invention, the surfaces facing each other of the magnet holding protrusions (10) that limit the slot orifice (11) are concave.

Figure 11:
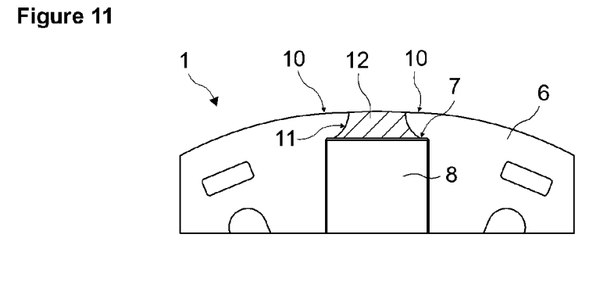
FIG. 11—is the view of the magnet slot orifice of the spoke rotor in another embodiment of the present invention.
Figure 12:
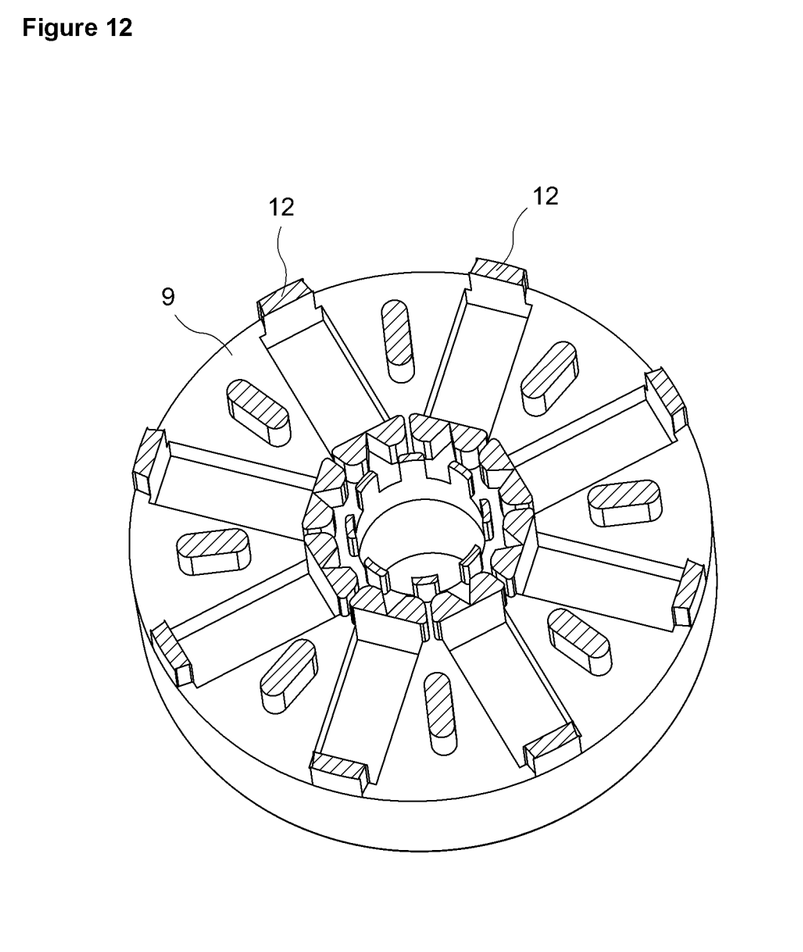
FIG. 12—is the view of cross-section A-A in FIG. 3.

In another embodiment of the present invention, the surfaces facing each other of the magnet holding protrusions (10) that limit the slot orifice (11) are convex.

In the above-mentioned two embodiments, the curved edges of the slot orifice (11) facilitate the injection of non-magnetic material into the slot orifice (11) during the injection molding process. The bars (12) are injected into the slot orifices (11) without leaving any gaps, the cage structure formed by the bars (12) around the core (2) is strengthened and the mechanical resistance of the rotor (1) is increased.

In the rotor (1) of the present invention, the slot orifices (11), narrowing from magnet slots (7) towards the air gap (15) around the core (2) and wherein a non-magnetic material is injected, increase the resistance to centrifugal forces and strengthen the mechanical structure.

The invention claimed is:

1. A spoke-type permanent magnet rotor forming a rotating part of an electric motor inside a stator and having an air gap between an inner surface of the stator and itself, comprising a cylindrical ferromagnetic core, a shaft forming a rotational axis thereof, a hub disposed at the center of the cylindrical ferromagnetic core and having a shaft hole that bears the shaft, more than one pole segment disposed all around the hub, more than one magnet slot disposed between the pole segments, more than one magnet placed in the magnet slots and extending outwards in a radial direction, two end rings produced from non-magnetic materials and fixed on front and rear planar surfaces of the cylindrical ferromagnetic core by an injection molding method, and more than one magnet holding protrusion extending from each pole segment over the magnet slots between the magnet and the air gap, characterized in that more than one slot orifice situated between the magnet holding protrusions and narrowing from an outer end of the magnet placed in the magnet slot towards the air gap in the radial direction, and more than one bar produced by injecting non-magnetic material into the slot orifices, extending along the cylindrical ferromagnetic core in an axial direction between the end rings and surrounding the cylindrical ferromagnetic core between the magnet slots and the air gap, each slot orifice having a first end portion adjacent to the magnet slot and a second end portion adjacent to the air gap, wherein a circumferential width of the first end portion of the slot orifice decreases in a direction away from the magnet slot, and the circumferential width of the second end portion of the slot orifice is constant, forming a Y configuration for the slot orifice.

2. A rotor as in claim 1, characterized in that the magnet holding protrusions that limit the slot orifices, angularly positioned so as to get closer to each other at a magnet side and in parallel at an air gap side.

3. A spoke-type permanent magnet rotor forming a rotating part of an electric motor inside a stator and having an air gap between an inner surface of the stator and itself, comprising a cylindrical ferromagnetic core, a shaft forming a rotational axis thereof, a hub disposed at the center of the cylindrical ferromagnetic core and having a shaft hole that bears the shaft, more than one pole segment disposed all around the hub, more than one magnet slot disposed between the pole segments, more than one magnet placed in the magnet slots and extending outwards in a radial direction, two end rings produced from non-magnetic materials and fixed on front and rear planar surfaces of the cylindrical ferromagnetic core by an injection molding method, and more than one magnet holding protrusion extending from each pole segment over the magnet slots between the magnet and the air gap, characterized in that more than one slot orifice situated between the magnet holding protrusions and narrowing from an outer end of the magnet placed in the magnet slot towards the air gap in the radial direction, and more than one bar formed on the cylindrical ferromagnetic core by injecting non-magnetic material into the slot orifices, extending along the cylindrical ferromagnetic core in an axial direction between the end rings and surrounding the cylindrical ferromagnetic core between the magnet slots and the air gap, each slot orifice having a first end portion adjacent to the magnet slot and a second end portion adjacent to the air gap, wherein a circumferential width of the first end portion of the slot orifice decreases in a direction away from the magnet slot, and the circumferential width of the second end portion of the slot orifice is constant, forming a Y configuration for the slot orifice.

4. A spoke-type permanent magnet rotor forming a rotating part of an electric motor inside a stator and having an air gap between an inner surface of the stator and itself, comprising a cylindrical ferromagnetic core, a shaft forming a rotational axis thereof, a hub disposed at the center of the cylindrical ferromagnetic core and having a shaft hole that bears the shaft, more than one pole segment disposed all around the hub, more than one magnet slot disposed between the pole segments, more than one magnet placed in the magnet slots and extending outwards in a radial direction, two end rings produced from non-magnetic materials and fixed on front and rear planar surfaces of the cylindrical ferromagnetic core by an injection molding method, and more than one magnet holding protrusion extending from each pole segment over the magnet slots between the magnet and the air gap, characterized in that more than one slot orifice situated between the magnet holding protrusions and narrowing from an outer end of the magnet placed in the magnet slot towards the air gap in the radial direction, and more than one bar produced by injecting non-magnetic material into the slot orifices, extending along the cylindrical ferromagnetic core in an axial direction between the end rings and surrounding the cylindrical ferromagnetic core between the magnet slots and the air gap, wherein cross-sections of the bars have the same narrowing form as the slot orifices, each slot orifice having a first end portion adjacent to the magnet slot and a second end portion adjacent to the air gap, wherein a circumferential width of the first end portion of the slot orifice decreases in a direction away from the magnet slot, and the circumferential width of the second end portion of the slot orifice is constant, forming a Y configuration for the slot orifice.

* * * * *